Patented May 27, 1924.

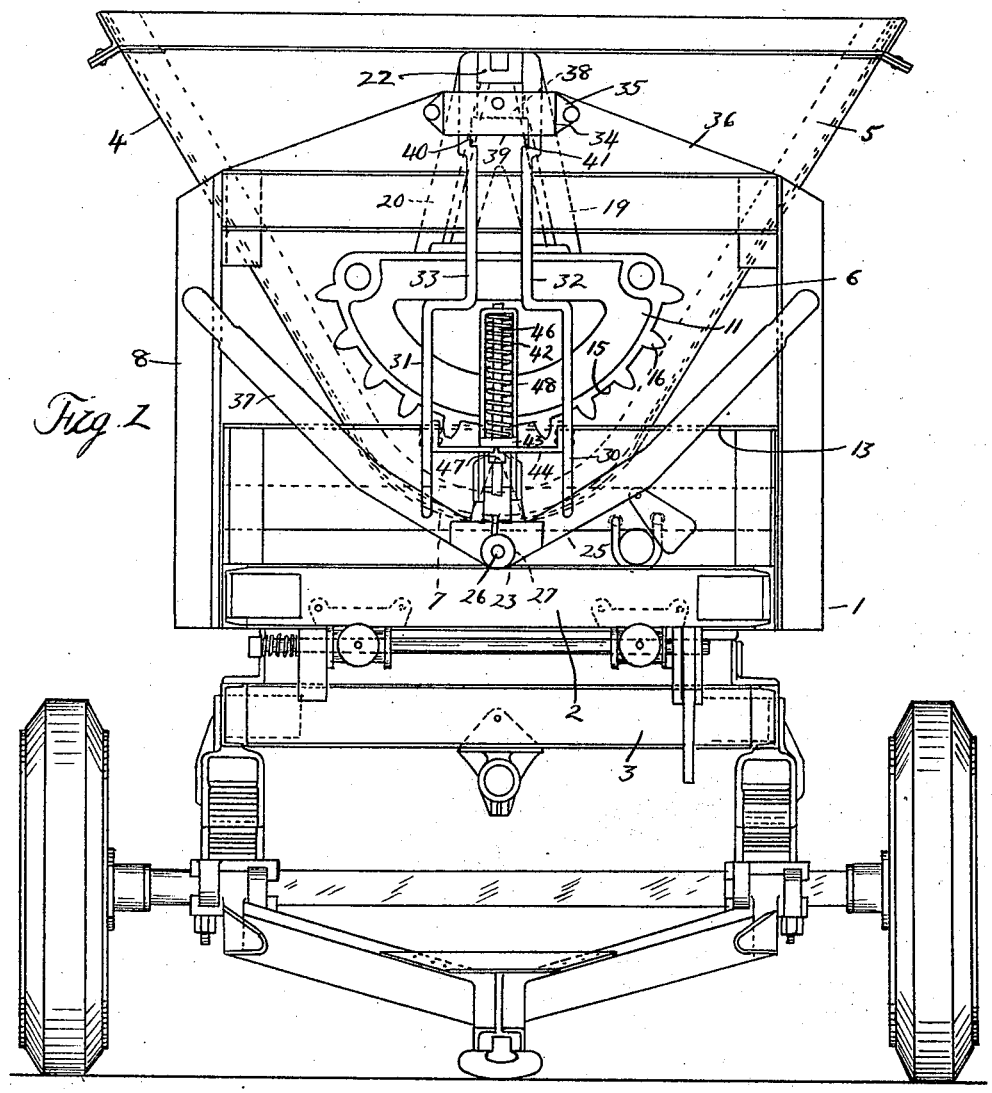

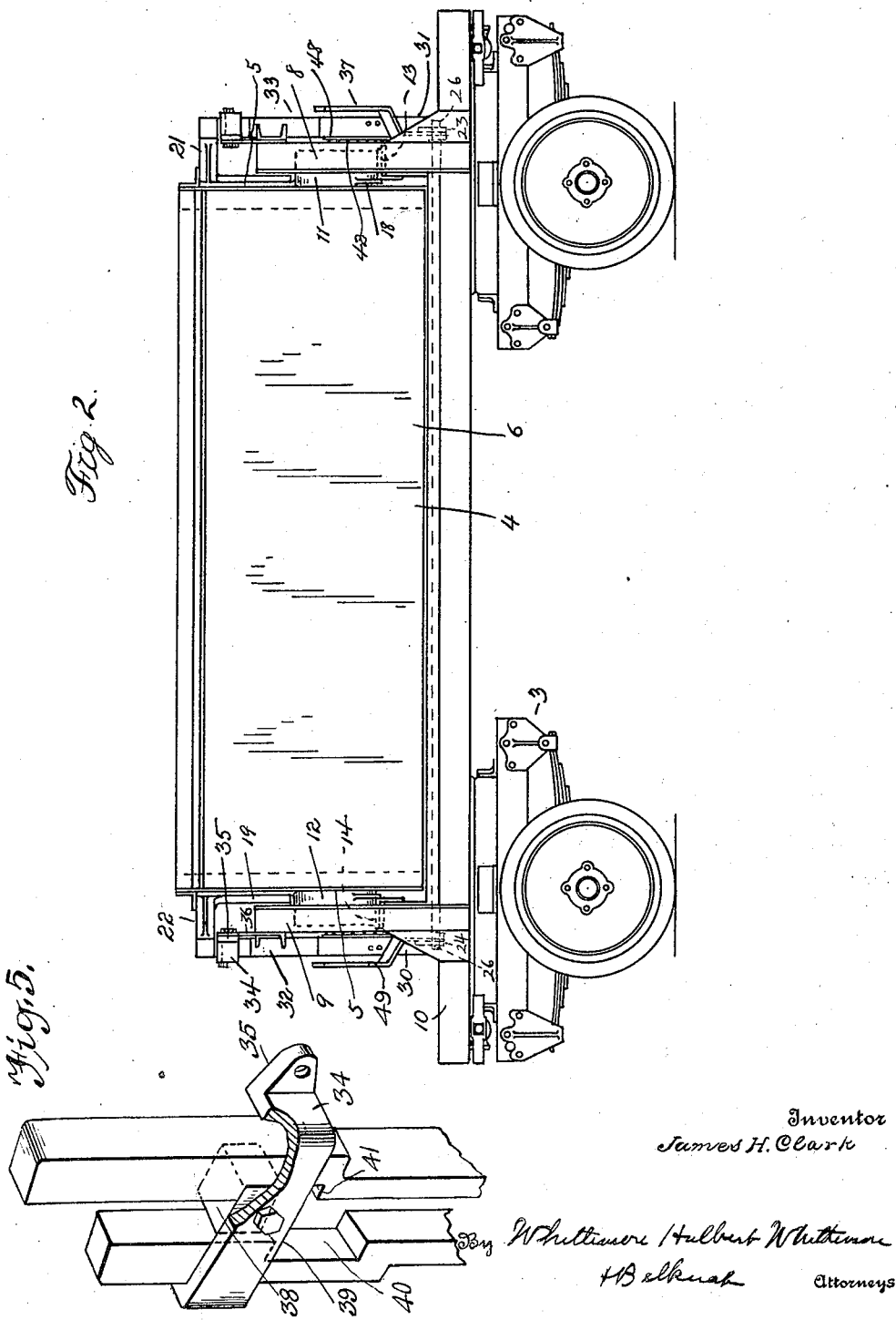

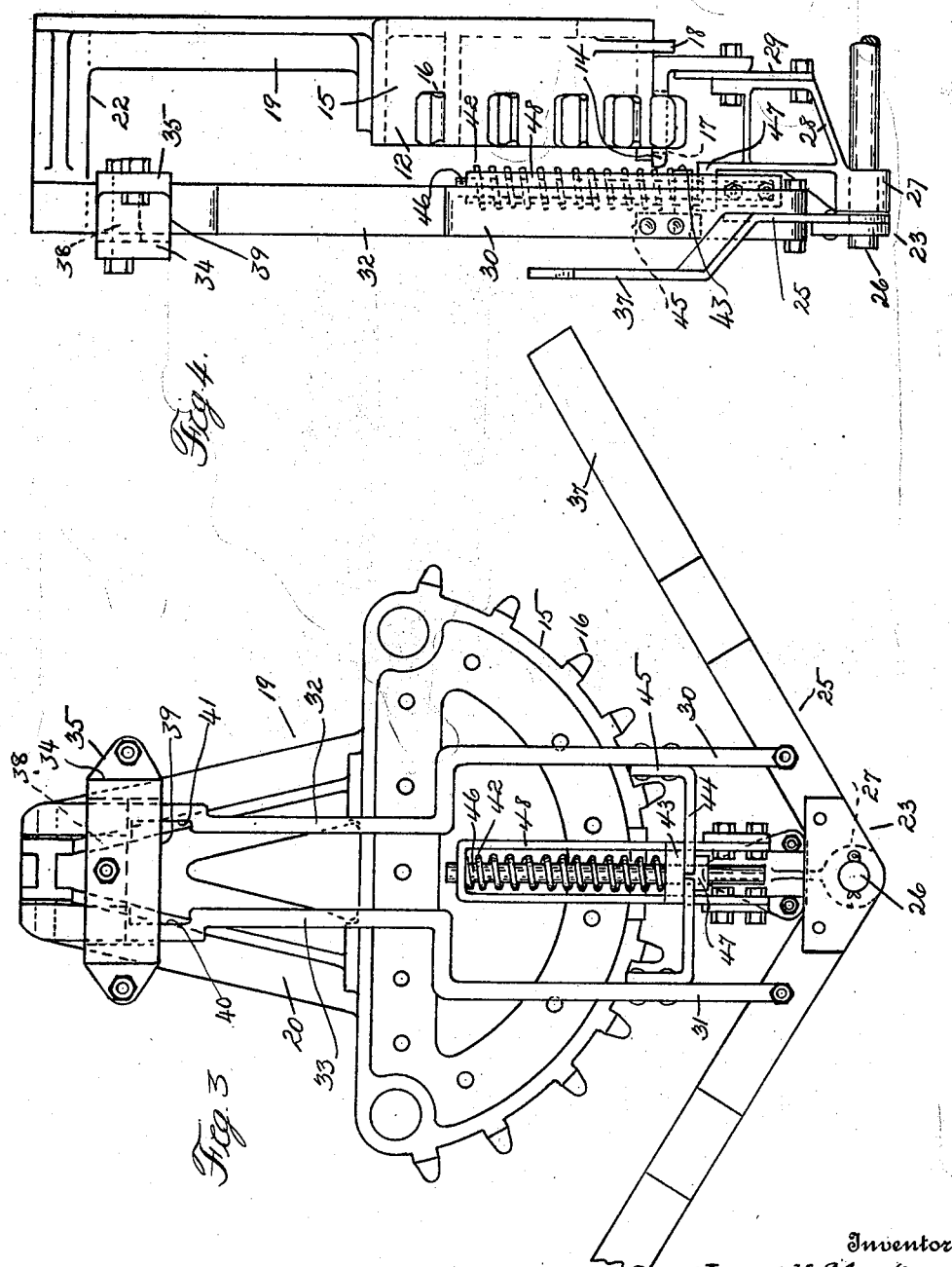

1,495,382

UNITED STATES PATENT OFFICE.

JAMES H. CLARK, OF DETROIT, MICHIGAN.

DUMPING MECHANISM FOR VEHICLES.

Application filed March 19, 1923. Serial No. 626,215.

*To all whom it may concern:*

Be it known that I, JAMES H. CLARK, a citizen of the United States of America, residing at Detroit, in the county of Wayne and State of Michigan, have invented certain new and useful Improvements in Dumping Mechanism for Vehicles, of which the following is a specification, reference being had therein to the accompanying drawings.

This invention relates to vehicles and refers more particularly to an attachment for vehicles having tiltable bodies.

An object of the invention is to provide simple and reliable devices which are adapted to normally retain the body in upright position to receive and carry a load and which are adapted to limit the return movement of the body after same has been tilted to dump the load.

Another object is to provide efficient and practical means which may be operated at different points of the vehicle for actuating the retaining means to permit the body to be tilted to dump the load.

Another object is to provide strong and durable means for detachably holding the retaining means in a predetermined position to permit the body to be returned to normal position.

Another object is to provide simple and efficient means for automatically moving the retaining means into engagement with the holding means during the tilting movement of the body and for automatically returning the retaining means to normal position when the latter is released from the holding means.

With the above and other objects in view the invention consists in certain novel features of construction, combination and arrangement of parts as will be more fully described and particularly pointed out in the appended claims:—

In the accompanying drawings:

Figure 1 is a front elevation of a vehicle embodying my invention;

Figure 2 is a side elevation of the end thereof;

Figure 3 is an enlarged front elevation of the attachment;

Figure 4 is an enlarged side elevation of the construction illustrated in Figure 3.

Fig. 5 is a detailed perspective view of the upper part of the locking mechanism.

Referring now to the drawings in which like characters of reference designate corresponding parts throughout the several views, the numeral 1 designates a trailer having a horizontal frame 2 mounted upon a pair of wheeled trucks 3. The body 4 of the vehicle is preferably of the tiltable type and is preferably provided with vertical ends 5 and downwardly converging sides 6 which connect into a rounded bottom 7. The body is adapted to discharge the load upon either side of the trailer and is preferably mounted between a pair of upright frames 8 and 9 respectively which are rigidly secured to the side bars 10 of the horizontal frame 2. In detail, a pair of rockers 11 and 12 respectively are rigidly secured to the ends 5 of the body and are supported upon horizontal cross bars 13 and 14 respectively of the upright frames. The bearing surfaces 15 of the rockers are preferably provided with teeth 16 which engage spaced openings 17 in the cross bars 13 and 14 and are adapted to prevent any sliding movement of the body transversely of the trailer, while projections 18 extend downwardly from the rockers in rear of the cross bars and are adapted to prevent any movement of the body lengthwise of the trailer. A pair of inverted substantially V-shaped members 19 and 20 extend upwardly from the rollers 11 and 12 respectively and are provided with outwardly extending horizontal projections 21 and 22 respectively which are disposed in the vertical central plane of the body.

The body is normally retained in upright position by means of suitable devices which are generally designated by the numerals 23 and 24 and which are preferably located at the ends of the body for engagement with the horizontal projections 21 and 22 respectively. The devices 23 and 24 are preferably identical in construction, consequently, only the device 23 will be described. In detail, a substantially V-shaped member 25 is preferably keyed upon a shaft 26 which extends longitudinally of the horizontal frame 2 and which is journaled in a bearing 27 of a bracket 28 that is secured to the lower cross plate 29 of the frame 8. A pair of vertical stops 30 and 31 have bifurcated lower ends pivotally secured to the arms of the V-shaped member 25 adjacent to the shaft 26 and are preferably provided with parallel offset portions 32 and 33 respectively which extend upwardly between the parallel ends 34 of a bracket 35 that is secured to the upper cross plate 36 of the frame. The off set portions of the stops are normally disposed upon the opposite sides of the horizontal projection 21 and normally cooperate with the bracket 35 to retain the body in upright position.

The arms of the V-shaped member 25 are preferably provided with offset extensions 37 which serve as handles that are adapted to be used to rock the V-shaped members to move one of the stops downwardly so as to permit the tilting of the body and to move the other stops upwardly.

It is desirable that the stop which has been lowered to permit the tilting of the body be detachably held in lowered position to permit the return movement of the body to normal upright position and that the other stop which has been raised, will be detachably held in the path of the horizontal projection 21 so as to limit the return movement of the body. Although, any suitable means might be employed for detachably holding either stop in raised position and for causing the other stop to remain in lowered position when the body is tilted, I preferably employ a block 38 which is disposed in the vertical central plane of the body and which is located between the upper cross plate 36 and the base 39 of the bracket 35 and between the offset portions of the stops. The ends of the block are adapted to be received alternately in substantially rectangular shaped recesses 40 and 41 in the adjacent faces of the offset portions of the stops.

It is also desirable that engagement between the block 38 and either of the recesses in the stops be made automatically during the tilting movement of the body and that the stops will be returned automatically to normal position upon opposite sides of the horizontal projection 21 after the latter strikes against the raised stop and disengages the recesses therein from the block during the return movement of the body to normal upright position. To accomplish this, I preferably employ a coil spring 42 which normally retains a bearing block 43 upon the opposed horizontal portions 44 of a pair of angle members 45 that are rigidly secured to the adjacent faces of the stops adjacent to the lower ends thereof. The coil spring preferably surrounds a vertical rod 46 which is slidably mounted in a horizontal bearing 47 of the bracket 28 and in the upper end of a relatively long inverted substantially U-shaped member 48 that is rigidly secured to the bracket 28. The coil spring is preferably located between the bearing block 43 and the upper end of the U-shaped member 48. The bearing block is preferably rigidly secured to the rod 46 and is adapted to travel between the sides of the U-shaped member.

In order that the retaining devices 23 and 24 may be operated simultaneously from either end of the trailer, the V-shaped member 49 of the retaining device 24 is preferably keyed upon the shaft 26 at the opposite end of the body.

In use, one of the handles may be used to rock simultaneously both of the V-shaped members of the retaining devices which will cause the stops upon one side of the horizontal projections extending outwardly from the body, to move downwardly to permit the body to be tilted, and will cause the stops on the other side of the horizontal projections to move upwardly. When the last-mentioned stops are raised, the horizontal portions of the angle members 45 secured thereto are raised also and they in turn move the bearing blocks upwardly against the tension of the coil springs with the result that the recesses in the offset portions of the raised stops receive the adjacent ends of the blocks 38 and are detachably held thereby.

The body may be returned manually to normal position. During the return movement, the horizontal projections extending outwardly from the body strike against the raised stops and disengage the recesses therein from the blocks. The coil springs then move the bearing blocks downwardly which in turn move downwardly the horizontal portions of the raised angle members and stops secured thereto so that the offset portions of the latter will be disposed in normal position upon one side of the horizontal projections extending from the body. Downward movement of the raised stops causes the V-shaped members to rock in the opposite direction with the result that the lowered stops are raised so that the offset portions thereof will be disposed in normal position upon the opposite side of the horizontal projections extending from the body. The body will then be retained in normal upright position.

While it is believed that from the foregoing description the nature and advantages of the invention will be readily apparent, I desire to have it understood that I do not limit myself to what is herein shown and described and that such changes may be resorted to as desired and fall within the scope of what is claimed.

What I claim as my invention is:

1. The combination with a vehicle having a tiltable body, of means for normally retaining said body in upright position, means for actuating said retaining means to permit said body to be tilted, and means independent of the means aforesaid for detachably holding the retaining means in a position to permit the body to be returned to normal position.

2. The combination with a vehicle having a tiltable body, of means for normally retaining said body in upright position, means for actuating said retaining means to permit said body to be tilted, and means for detachably holding the retaining means in a position to permit the body to be returned to normal position and to limit the return movement thereof.

3. The combination with a vehicle having a tiltable body, of means for normally retaining said body in upright position, means adapted to be operated at different points of the vehicle for actuating the retaining means to permit said body to be tilted, and means for detachably holding the retaining means in a position to permit the body to be returned to normal position and to limit the return movement thereof.

4. The combination with a vehicle having a tiltable body, of means for normally retaining said body in upright position, means for actuating said retaining means to permit said body to be tilted, means for detachably holding the retaining means in a position to permit the body to be returned to normal position, and means independent of the means aforesaid and operable automatically when said body is tilted for causing said retaining means to be held by said holding means.

5. The combination with a vehicle having a tiltable body, of means for normally retaining said body in upright position, means for actuating said retaining means to permit said body to be tilted, means for detachably holding the retaining means in a position to permit the body to be returned to normal position, and means operable automatically for returning said retaining means to normal position when the same is released from said holding means.

6. The combination with a vehicle having a tiltable body, of means for normally retaining said body in upright position, means for actuating said retaining means to permit said body to be tilted, means for detachably holding the retaining means in a position to permit the body to be returned to normal position, and means operable automatically when said body is tilted for causing said retaining means to be held by said holding means, the automatic means aforesaid being adapted to return said retaining means to normal position when the same is released from said holding means.

7. The combination with a vehicle having a tiltable body, of means for normally retaining said body in upright position, means for actuating said retaining means to permit said body to be tilted, and means for detachably holding the retaining means in a position to permit the body to be returned to normal position, said retaining means being adapted to be released from said holding means during the return movement of said body to normal position.

8. The combination with a vehicle having a tiltable body, of means for normally retaining said body in upright position, means for actuating said retaining means to permit said body to be tilted, means for detachably holding the retaining means in a position to permit the body to be returned to normal position, said retaining means being adapted to be released from said holding means during the return movement of said body to normal position, and means operable automatically for returning said retaining means to normal position when the same is released from said holding means.

9. The combination with a vehicle having a tiltable body for carrying a load, of means for normally retaining the body in upright position, yieldable means for resisting movement of said retaining means, means for actuating said retaining means against the tension of said yieldable means to permit said body to be tilted to dump the load, and means for detachably holding said retaining means in a pre-determined position to permit said body to be returned to normal position, said retaining means being adapted to be released from said holding means during the return movement of said body to normal position, and said yieldable means being adapted to return said retaining means to normal position when same is released.

10. The combination with a vehicle having a tiltable body, of a projection upon said body, means normally engaging said projection for retaining said body in upright position, means for actuating said retaining means to permit said body to be tilted, and means independent of the means aforesaid for detachably holding the retaining means in a position to permit the body to be returned to normal position.

11. The combination with a vehicle having a tiltable body, of a projection upon said body, stops normally engaging the opposite sides of said projection for retaining said body in upright position, means for actuating said stops to permit said body to be tilted, and means for detachably holding said stops in a position to permit said body to be returned to normal position and to limit the return movement thereof.

12. The combination with a vehicle having a tiltable body, of a projection upon said body, stops normally engaging opposite sides of said projection for retaining said body in upright position, means for lowering one of said stops to permit said body to be tilted, and for simultaneously raising the other stop, and means for detachably holding the lowered stop in lowered position to permit the body to be returned to normal position and for holding the raised stop in the path of the projection to limit the return movement of said body.

13. The combination with a vehicle having a tiltable body, of a projection upon said body, stops normally engaging opposite sides of said projection for retaining said body in upright position, means for lowering one of said stops to permit said body to be tilted and for simultaneously raising the other stop, and means for detachably holding the lowered stop in lowered position to permit the body to be returned to normal position and for holding the raised stop in the path of the projection to limit the return movement of said body, said projection being adapted to disengage the raised stop from said holding means during the return movement of said body.

14. The combination with a vehicle having a tiltable body, of a projection upon said body, stops normally engaging opposite sides of said projection for retaining said body in upright position, means for lowering one of said stops to permit said body to be tilted and for simultaneously raising the other stop, means for detachably holding the lowered stop in lowered position to permit the body to be returned to normal position and for holding the raised stop in the path of the projection to limit the return movement of said body, said projection being adapted to disengage the raised stop from said holding means during the return movement of said body, and means operable upon release of said raised stop from said holding means for automatically returning both of said stops to normal position.

15. The combination with a vehicle having a tiltable body, of a projection upon said body, stops normally engaging opposite sides of said projection for retaining said body in upright position, means for lowering one of said stops to permit said body to be tilted and for simultaneously raising the other stop, said stops having recesses therein, and a stationary member alternately engageable with said recesses for detachably holding the lowered stops in lowered position to permit the body to be returned to normal position and for detachably holding the raised stop in the path of the projection to limit the return movement of said body.

16. The combination with a vehicle having a horizontal frame, of a pair of upright frames mounted on said horizontal frame, a tiltable body supported upon said upright frames, means for normally retaining said body in upright position, means for actuating said retaining means to permit said body to be tilted, and means independent of the means aforesaid for detachably holding the retaining means in a position to permit the body to be returned to normal position and to limit the return movement thereof.

17. The combination with a vehicle having a tiltable body, of a projection upon said body, a shaft extending longitudinally of said body, a member non-rotatively secured to said shaft, stops carried by said member and normally engaging opposite sides of said projection, handles extending from said member adapted to be used to rock the same to move said stops to permit the body to be tilted, means for detachably holding the stops in a position to permit the body to be returned to normal position and to limit the return movement thereof, and means for returning the stops to normal position when the same are released.

18. The combination with a vehicle having a tiltable body, of a projection upon said body, a shaft extending longitudinally of said body, a member non-rotatively secured to said shaft, stops carried by said member and normally engaging opposite sides of said projection, a handle extending from said member adapted to be used to rock the same to move said stops to permit the body to be tilted, and means for detachably holding said stops in a position to permit the body to be returned to normal position.

In testimony whereof I affix my signature.

JAMES H. CLARK.